United States Patent
Richman et al.

(10) Patent No.: US 11,323,778 B2
(45) Date of Patent: May 3, 2022

(54) UNIFIED PROGRAMMING GUIDE FOR CONTENT ASSOCIATED WITH BROADCASTER AND VOD APPLICATIONS

(71) Applicant: SONY GROUP CORPORATION, Tokyo (JP)

(72) Inventors: Steven Richman, San Diego, CA (US); Tanmay Agnihotri, San Diego, CA (US); Graham Clift, Poway, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/029,535

(22) Filed: Sep. 23, 2020

(65) Prior Publication Data
US 2022/0095018 A1    Mar. 24, 2022

(51) Int. Cl.
| H04N 5/445 | (2011.01) |
| H04N 21/482 | (2011.01) |
| H04N 21/84 | (2011.01) |

(52) U.S. Cl.
CPC ..... *H04N 21/4826* (2013.01); *H04N 21/4828* (2013.01); *H04N 21/84* (2013.01)

(58) Field of Classification Search
CPC . H04N 21/4826; H04N 21/4828; H04N 21/84
See application file for complete search history.

(56) References Cited

U.S. PATENT DOCUMENTS

| 8,359,320 B2 | 1/2013 | Howcroft et al. |
| 9,258,610 B2 | 2/2016 | Kulick et al. |
| (Continued) | | |

FOREIGN PATENT DOCUMENTS

| CA | 2601792 A1 | 10/2006 |
| CA | 2944985 A1 | 11/2015 |
| (Continued) | | |

OTHER PUBLICATIONS

Bellekens, et al., "On-the-fly Data Integration for Personalized Television Recommender Systems", Eighth International Conference on Web Engineering, Aug. 2008, 04 pages.
(Continued)

*Primary Examiner* — Annan Q Shang
(74) *Attorney, Agent, or Firm* — Chip Law Group

(57) ABSTRACT

An electronic device and method are provided for display of a programming guide for content associated with broadcaster and VOD applications. The electronic device receives a DTV signal that include programming content items associated with broadcaster applications on the electronic device and extracts a set of in-band metadata associated with programming content items. The electronic device selects a set of VOD assets offered by at least one VOD application on the electronic device and extracts a set of out-of-band metadata associated with the programming content items and the selected set of VOD assets from at least one metadata source. The electronic device parses the set of in-band metadata and the set of out-of-band metadata and combines such parsed sets of metadata into a unified metadata file based on a master template. Based on the unified metadata file, the electronic device controls a display device to render a programming guide.

20 Claims, 6 Drawing Sheets

(56) References Cited

U.S. PATENT DOCUMENTS

| | | |
|---|---|---|
| 2005/0182792 A1 | 8/2005 | Israel et al. |
| 2006/0236342 A1 | 10/2006 | Kunkel et al. |
| 2006/0271594 A1 | 11/2006 | Haberman |
| 2007/0156726 A1* | 7/2007 | Levy .................. G06F 21/10 |
| 2008/0222201 A1* | 9/2008 | Chen .................. G06F 16/58 |
| 2009/0150735 A1 | 6/2009 | Israel et al. |
| 2009/0313295 A1* | 12/2009 | Blaxland ............ G06F 16/284 |
| 2011/0289419 A1* | 11/2011 | Yu .................... H04N 21/485 |
| | | 715/738 |
| 2012/0054797 A1* | 3/2012 | Skog .............. H04N 21/42224 |
| | | 725/41 |
| 2012/0159549 A1 | 6/2012 | Douillet et al. |
| 2012/0185492 A1 | 7/2012 | Israel et al. |
| 2012/0311633 A1 | 12/2012 | Mandrekar et al. |
| 2013/0201009 A1 | 8/2013 | Lin et al. |
| 2013/0291018 A1* | 10/2013 | Billings .......... H04N 21/44222 |
| | | 725/46 |
| 2014/0006951 A1* | 1/2014 | Hunter ................ H04N 21/431 |
| | | 715/719 |
| 2014/0245354 A1 | 8/2014 | Kunkel et al. |
| 2015/0070585 A1* | 3/2015 | Sharif-Ahmadi ..... H04L 65/607 |
| | | 348/564 |
| 2015/0121431 A1 | 4/2015 | Jacoby et al. |
| 2015/0161196 A1 | 6/2015 | Israel et al. |
| 2015/0205877 A1* | 7/2015 | Rhoads ................ G06F 16/683 |
| | | 707/723 |
| 2016/0150294 A1* | 5/2016 | Phatak ............ H04N 21/23424 |
| | | 725/23 |
| 2016/0156955 A1 | 6/2016 | Israel et al. |
| 2016/0241922 A1* | 8/2016 | Carpenter .......... H04N 21/6543 |
| 2016/0248828 A1 | 8/2016 | Kitahara et al. |
| 2017/0034590 A1 | 2/2017 | Jacoby et al. |
| 2017/0048571 A1 | 2/2017 | Israel et al. |
| 2017/0055006 A1 | 2/2017 | Yamagishi |
| 2017/0154163 A1* | 6/2017 | Jerby Arnon ............ G16H 50/50 |
| 2019/0281367 A1* | 9/2019 | Westerlund ......... H04N 21/8352 |
| 2019/0297128 A1 | 9/2019 | Kitahara et al. |
| 2019/0342351 A1* | 11/2019 | Garrido .................. H04L 67/14 |
| 2020/0169788 A1 | 5/2020 | Clift |
| 2021/0037075 A1 | 2/2021 | Kitahara et al. |

FOREIGN PATENT DOCUMENTS

| | | |
|---|---|---|
| CA | 2932717 A1 | 4/2016 |
| CN | 101099149 A | 1/2008 |
| CN | 101194505 A | 6/2008 |
| CN | 101764973 A | 6/2010 |
| CN | 105981399 A | 9/2016 |
| CN | 106210860 A | 12/2016 |
| CN | 113056922 A | 6/2021 |
| EP | 1745430 A2 | 1/2007 |
| EP | 1882362 A1 | 1/2008 |
| EP | 2317449 A2 | 5/2011 |
| EP | 2557775 A2 | 2/2013 |
| EP | 3142374 A1 | 3/2017 |
| EP | 3206409 A1 | 8/2017 |
| EP | 3868123 A1 | 8/2021 |
| JP | 2007-524160 A | 8/2007 |
| JP | 2008-535411 A | 8/2008 |
| JP | 2010-154554 A | 7/2010 |
| JP | 2012-108948 A | 6/2012 |
| JP | 4981454 B2 | 7/2012 |
| JP | 2013-165527 A | 8/2013 |
| JP | 5495556 B2 | 5/2014 |
| JP | 2014-241632 A | 12/2014 |
| JP | 5677993 B2 | 2/2015 |
| JP | 6597604 B2 | 10/2019 |
| JP | 6610553 B2 | 11/2019 |
| KR | 10-2006-0126717 A | 12/2006 |
| KR | 10-2011-0091602 A | 8/2011 |
| KR | 10-2017-0007258 A | 1/2017 |
| KR | 10-2017-0068408 A | 6/2017 |
| KR | 10-2021-0076133 A | 6/2021 |
| MX | 366870 B | 7/2019 |
| WO | 2005/072157 A2 | 8/2005 |
| WO | 2006/105480 A1 | 10/2006 |
| WO | 2007/143189 A2 | 12/2007 |
| WO | 2015/170565 A1 | 11/2015 |
| WO | 2016/056412 A1 | 4/2016 |
| WO | 2020/104869 A1 | 5/2020 |

OTHER PUBLICATIONS

"Media Content Distribution (MCD), Programme guide information distribution, situation and perspective", Technical Report, European Telecommunication Standards Institute (ETSI), 650, Route Des Lucioles; F-06921 Sophia-Antipolis, France, vol. MCD, No. V1.1.1, XP014065614, May 1, 2011.

DVB Organization,"A332-2017a-service-announcement-2", Digital video broadcasting, C/O EBU 17A Ancient Route, CH 1218 Grand Saconnex, Geneva, Switzerland, XP017855624, Aug. 3, 2018, 04 Pages.

International Search Report and Written Opinion of PCT Application No. PCT/IB2021/058434, dated Dec. 7, 2021, 16 pages of ISRWO.

* cited by examiner

UNIFIED PROGRAMMING GUIDE FOR CONTENT ASSOCIATED WITH BROADCASTER AND VOD APPLICATIONS

CROSS-REFERENCE TO RELATED APPLICATIONS/INCORPORATION BY REFERENCE

None.

FIELD

Various embodiments of the disclosure relate to display devices and interactive user interfaces for the display devices. More specifically, various embodiments of the disclosure relate to an electronic device and method for display of unified programming guide for content associated with broadcaster and video-on-demand (VOD) applications.

BACKGROUND

Traditional broadcast television (TV) may produce and transmit one digital signal over a specified RF channel to be received by a television and be digitally tuned, decoded and rendered on the TV screen taking up the full screen or viewing area. The digital signal may contain metadata related to programming information and scheduling information for various broadcast channels. For example, the programming information may contain virtual channel IDs, channel call letters, program titles, media duration among few other data points associated with TV listings. The metadata may generally lack sufficient depth and detail to satisfy a consumer's curiosity about video programs.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for display of a unified programming guide for content associated with broadcaster and VOD applications is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
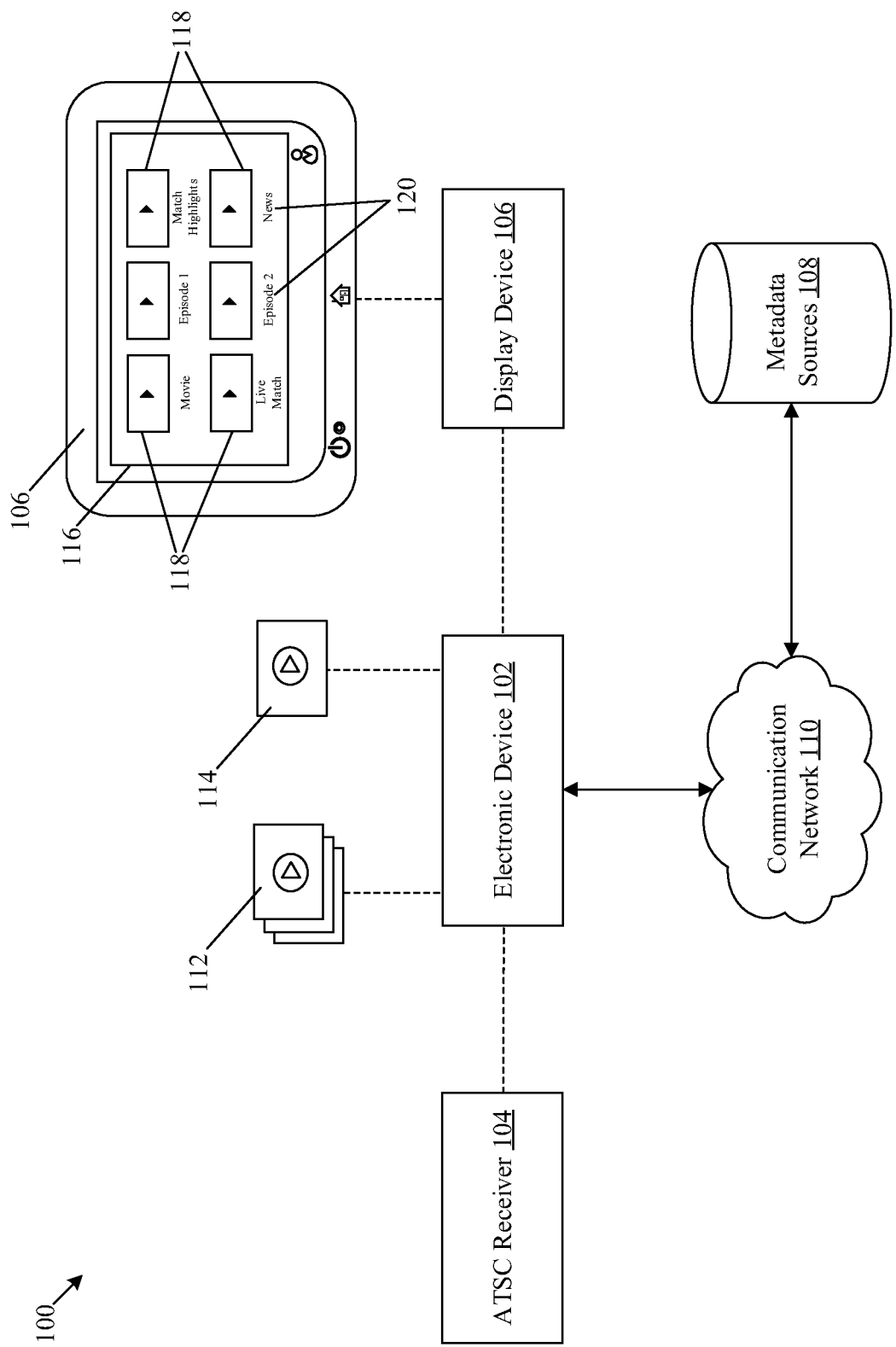
FIG. 1 is a diagram that illustrates an exemplary network environment for display of a unified programming guide for content associated with broadcaster and VOD applications, in accordance with an embodiment of the disclosure.

The following described implementations may be found in the disclosed electronic device and method for display of a unified programming guide for content associated with broadcaster and VOD applications. Exemplary aspects of the disclosure provide an electronic device (for example, a smart television) which may control a display device to render a programming guide. The programming guide may include multiple viewing options and content descriptors for programming content items and VOD assets. The programming guide may be rendered based on a unified metadata file, which may be obtained based on a combination of metadata (i.e. in-band metadata) received from a digital television (DTV) signal and metadata (i.e. out-of-band metadata) received from other metadata sources that may be hosted on other accessible networks (such as on websites accessible over internet or Application Programming Interface (API) resource servers).

The DTV signal may include programming content items that may be associated with various broadcaster applications on the electronic device. The in-band metadata associated with the programming content items may be extracted from the DTV signal. A set of out-of-band metadata associated with the programming content items may be extracted from at least one metadata source. A unified metadata file may be generated based on the extracted set of in-band metadata and the extracted set of out-band metadata. Based on the unified metadata file, the programming guide may be rendered on the display device.

The programming guide may provide detailed information about the on-air broadcast content or VOD content to the user based on the unified metadata file which includes metadata components acquired from in-band metadata and various out-of-band metadata sources. The programming guide may also provide curated information collected from multiple sources and hence provide user with an ability to conduct deep search about the content that may be of interest to the user. The rendering of the programming guide with detailed information and the ability to conduct deep searches about the content may enhance the user experience.

The programming guide may provide recommendations based on the user's past experiences and recent user activities. Moreover, the programming guide may provide a single interface where all the content items, irrespective of the applications with which they may be associated, may be listed and played without a need to make a switch between the broadcaster and VOD applications.

The programming guide may be viewed as an application that may provide a monolithic unified guide generated by parsing the in-band and out-of-band metadata. Therefore, all content channels may be seen together in one monolithic guide and there may be no need of having separate apps rooted to each channel. The combination of metadata IP and broadcast may enhance the ability to find the actual content sought without having to refer only to a monolithic unified guide rather than executing each and every individual broadcasting application.

FIG. 1 is a diagram that illustrates an exemplary network environment for display of a unified programming guide for content associated with broadcaster and VOD applications, in accordance with an embodiment of the disclosure. With reference to FIG. 1, there is shown a diagram of a network environment 100. The network environment 100 includes an electronic device 102, an Advanced Televisions Systems Committee (ATSC) receiver 104, a display device 106, and metadata sources 108. The electronic device 102 may be communicatively coupled to the metadata sources 108, via a communication network 110. Also, the display device 106 may be communicatively coupled to the electronic device 102, via an input/output (I/O) interface or a network interface of the electronic device 102.

In the network environment 100, there is shown a plurality of broadcaster applications 112 and a VOD application 114 that may be accessible/installed on the electronic device 102. In FIG. 1, there is further shown a programming guide 116 that may be displayed on the display device 106.

In FIG. 1, the electronic device 102 and the display device 106 are shown as two separate devices; however, in some embodiments, the entire functionality of the display device 106 may be included in the electronic device 102, without a deviation from scope of the disclosure.

The electronic device 102 may include suitable logic, circuitry, and interfaces that may be configured to render a programing guide on the display device 106 based on a set of out-of-band metadata acquired from the metadata sources 108 and a set of in-band metadata included in a Digital Television (DTV) signal. Herein, the set of in-band metadata may be associated with a plurality of programming content items associated with the plurality of broadcaster applications 112. The set of out-of-band metadata may be associated with plurality of programming content items and a set of VOD assets associated with the VOD application 114. The electronic device 102 may include appropriate middleware and codecs, which may be capable of receiving and/or playback of in-band programming content items and out-of-band VOD assets, concurrently. Examples of an implementation of the electronic device 102 may include, but are not limited to, a smart television (TV), an Internet-Protocol TV (IPTV), a digital media player (DMP), a micro-console, a set-top-box, an Over-the-Top (OTT) player, a digital media streamer, a media extender/regulator, a digital media hub, a smartphone, a personal computer, a laptop, a tablet, a wearable electronic device, or any other display device with a capability to receive, decode, and play content encapsulated in broadcasting signals from cable or satellite networks, over-the-air broadcast, or internet-based communication signals.

The ATSC receiver 104 may include suitable logic, circuitry, and interfaces that may be configured to receive an over-the-air (OTA) broadcast signal and extract a DTV signal from the received OTA signal. The extracted DTV signal may include the plurality of programming content item and the set of in-band metadata associated with the plurality of programming content items. In an exemplary embodiment, the ATSC receiver 104 may be implemented as an ATSC 3.0 tuner. In such an exemplary implementation, the DTV signal may be an ATSC 3.0 signal which may comply with the ATSC 3.0 standard specification.

In FIG. 1, the electronic device 102 and ATSC receiver 104 are shown as two separate devices; however, in some embodiments, the entire functionality of the ATSC receiver 104 may be included in the electronic device 102, without a deviation from the scope of the disclosure.

The display device 106 may include suitable logic, circuitry, and interfaces that may be configured to render a programming guide, such as the programming guide 116. In one embodiment, the display device 106 may include a touch screen which may enable a user of the display device 106 to provide user input(s) directly via the touch screen. The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In at least one embodiment, the display device 106 may be a display unit of a smart TV, a head mounted device (HMD), a smart-glass device, a see-through display, a heads-up-display (HUD), an in-vehicle infotainment system, a projection-based display, an electro-chromic display, or a transparent display.

The metadata sources 108 may include suitable logic, circuitry, and interfaces that may be configured to store out-of-band metadata associated with programing content items. In some embodiments, the metadata sources 108 may also store out-of-band metadata associated with a plurality of VOD assets offered by VOD applications (such as the VOD application 114). Example implementations of the metadata sources 108 may include, but are not limited to, cloud servers, database servers, file servers, web servers, media servers, or application servers. In one embodiment, the metadata sources 108 may implement server-side web Application Programming Interfaces (APIs) with publicly exposed endpoints. Any electronic device (such as the electronic device 102) with appropriate authentications may be able to use such endpoints to access the out-of-band metadata.

The communication network 110 may include a communication medium through which the electronic device 102 and the metadata sources 108 may communicate with each other. The communication network 110 may be a wired or wireless communication network. Examples of the communication network 110 may include, but are not limited to, Internet, a Wireless Fidelity (Wi-Fi) network, a Personal Area Network (PAN), a Local Area Network (LAN), or a Metropolitan Area Network (MAN).

Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the ATSC receiver 104 may receive the OTA broadcast signal from a satellite broadcast network (not shown) or a terrestrial broadcast network (not shown). The OTA broadcast signal may include DTV signal(s) and carrier signal(s). The ATSC receiver 104 may extract the DTV signal from the received OTA signal and may transmit the extracted DTV signal to the electronic device 102. The electronic device 102 may receive the extracted DTV signal from the ATSC receiver 104. The extracted DTV signal may include the plurality of programming content items and the set of in-band metadata associated with the plurality of programming content items. Each of the plurality of programming content items may be associated with at least one of the plurality of broadcaster applications 112 on the electronic device 102. Every broadcaster application may correspond to a broadcaster or a broadcast network, such as a TV network that may broadcast programming content items (for example, TV programs or TV shows) and non-programming content items (such as TV ads) via one or more television stations.

From the extracted DTV signal, the electronic device 102 may extract the set of in-band metadata associated with the plurality of programming content items. The extracted set of in-band metadata may include programming information and schedule information associated with the plurality of programming content items. The set of in-band metadata may also include programming information and schedule information associated with future programming content items which may be broadcasted by the plurality of broadcaster applications in future (such as in next few hour(s) or day(s)).

In order to prepare a unified metadata file, VOD assets offered by VOD applications on the electronic device 102 may be selected. In one embodiment, the electronic device 102 may determine a context of each programming content item of the plurality of the programming content items. The context of a programming content item may be matched with the context of each VOD asset of a plurality of VOD assets offered by VOD applications (such as the VOD application 114) on the electronic device 102. From the plurality of VOD assets, the electronic device 102 may select a set of VOD assets based on a contextual match between the plurality of VOD assets and the plurality of programming content items. Additionally, or alternatively, the set of VOD assets may be selected based on user information, such as user activity data and user preference data. Details of the selection of the VOD assets is provided, for example, in FIG. 3.

The electronic device 102 may extract a set of out-of-band metadata from various metadata sources, such as the metadata sources 108. The extracted set of out-of-band metadata may be associated with the plurality of programming content items and/or the selected set of VOD assets. For each of the plurality of programming content items and/or the selected set of VOD assets, the extracted set of out-of-band metadata may include additional content descriptors, such as, but not limited to, program title, genre/sub-genre tags, cast and crew information, content ratings, user reviews, posters/trailer URLs, detailed plot or summary. Each out-of-band metadata may be extracted as a separate metadata file in a particular format, such as Extensible Markup Language (XML) or JavaScript Object Notation (JSON). The format of one or more metadata files may be different. Therefore, to prepare a unified metadata file from the set of in-band metadata and the set of out-of-band metadata, a suitable parsing method may need to be implemented to extract suitable metadata fields from such sets of metadata into the unified metadata file. The parsing method is described in detail, for example, in FIG. 3.

The electronic device 102 may parse the extracted set of in-band metadata and the extracted set of out-of-band metadata. Thereafter, the electronic device 102 may combine the parsed set of in-band metadata and the parsed set of out-of-band metadata into a unified metadata file for the plurality of programming content items and the selected set of VOD assets. Such combination may be performed based on a master template, which may act as a uniform formatter for all metadata files, i.e., the extracted set of in-band metadata and the extracted set of out-of-band metadata.

The electronic device 102 may control the display device to render a programming guide (such as the programming guide 116) based on the unified metadata file. The programming guide may include a plurality of viewing options 118 for the plurality of programming content items and the selected set of VOD assets. For example, the plurality of viewing options 118 may include in-app clickable thumbnails, content preview windows, video players, playable thumbnails, image/video carousels, slideshows, tiles, link previews, clickable grid cards, dynamic or static tables, Graphical UI elements integrated with a set of action-based offerings, and the like. The programming guide 116 may also include a plurality of content descriptors 120 for the plurality of programming content items and the selected set of VOD assets. Each content descriptor may provide additional detailed information (for example title, ratings, brief description, and the like) about a programming content item or a VOD asset.

Modifications, additions, or omissions may be made to FIG. 1 without departing from the scope of the present disclosure. For example, the network environment 100 may include more or fewer elements than those illustrated and described in the present disclosure.

Figure 2:
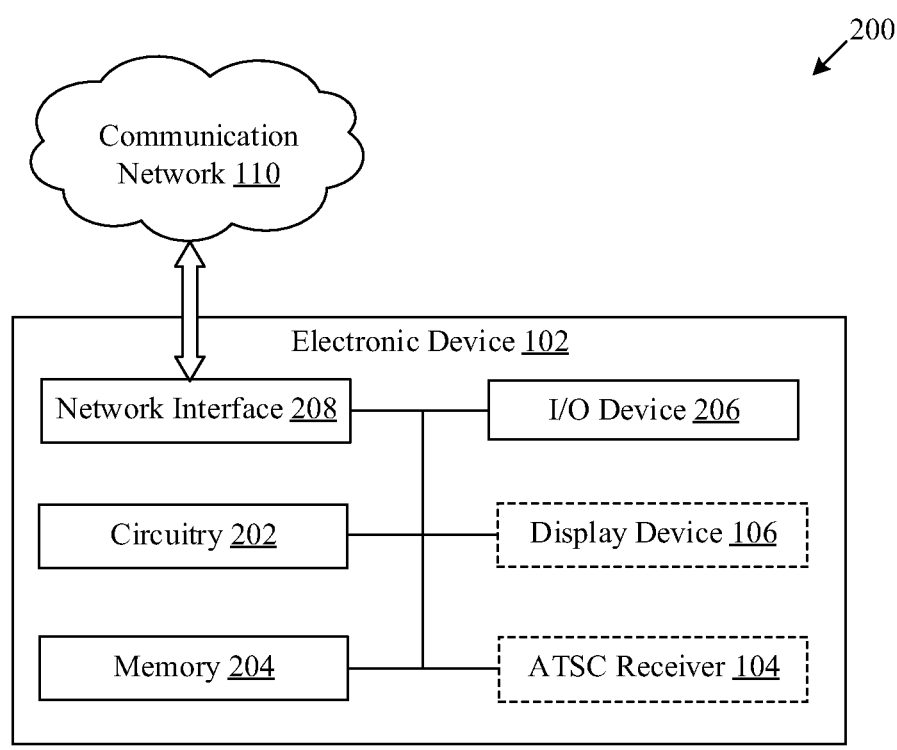
FIG. 2 is a block diagram of an exemplary electronic device for display of a unified programming guide for content associated with broadcaster and VOD applications, in accordance with an embodiment of the disclosure.

FIG. 2 is a block diagram of an exemplary electronic device for display of a unified programming guide for content associated with broadcaster and VOD applications, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. In at least one embodiment, the electronic device 102 may also include the ATSC receiver 104. In another embodiment, the electronic device 102 may also include the display device 106.

The circuitry 202 may be communicatively coupled to the memory 204, the I/O device 206, the network interface 208, the ATSC receiver 104 and the display device 106. The circuitry 202 may include suitable logic, circuitry, and interfaces that may be configured to execute program instructions associated with different operations to be executed by the electronic device 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and interfaces that may be configured to store the program instructions to be executed by the circuitry 202. In at least one embodiment, the memory 204 may also store the extracted set of in-band metadata, the extracted set of out-of-band metadata, and the unified metadata file based on which the programming guide 116 may be rendered on the electronic device 102. The memory 204 may also store user information associated with each of the broadcaster and VOD applications installed or accessible on the electronic device 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. The I/O device 206 which includes various input and output devices, may be configured to communicate with the circuitry 202. Examples of the I/O device 206 may include, but are not limited to, a remote console, a touch screen, a keyboard, a mouse, a joystick, a microphone, a display device (such as the display device 106), and a speaker.

The network interface 208 may include suitable logic, circuitry, and interfaces that may be configured to facilitate a communication between the circuitry 202 and the metadata sources 108, via the communication network 110. The network interface 208 may be implemented by use of various known technologies to support wired or wireless communication of the electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in FIGS. 3, 4, and 5.

Figure 3:
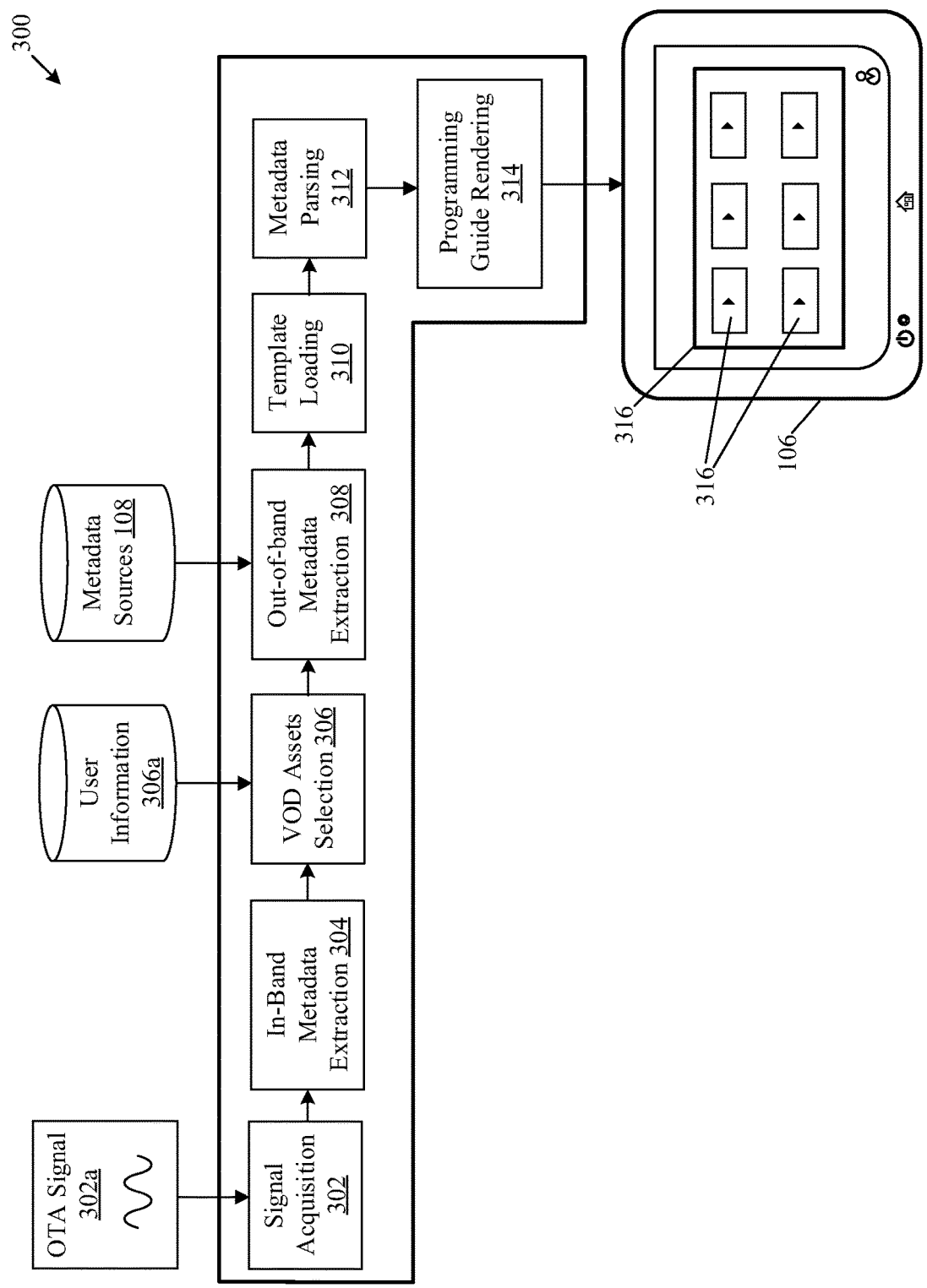
FIG. 3 is a diagram that illustrates exemplary operations for display of a unified programming guide for content associated with broadcaster and VOD applications, in accordance with an embodiment of the disclosure.

FIG. 3 is a diagram that illustrates exemplary operations for display of a unified programming guide for content associated with broadcaster and VOD applications, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 314, as described herein. The exemplary operations illustrated in the block diagram 300 may start at 302 and may be performed by any computing system, apparatus, or device, such as by the electronic device 102 of FIG. 1 or FIG. 2. Although illustrated with discrete blocks, the exemplary operations associated with one or more blocks of the block diagram 300 may be divided into additional blocks, combined into fewer blocks, or eliminated, depending on the particular implementation.

At 302, signal acquisition may be performed. The circuitry 202 may receive an OTA broadcast signal 302a from a terrestrial broadcast network or a satellite-based broadcast network. The received OTA broadcast signal 302a may be received from a broadcast channel and may include a DTV signal and a carrier signal. The circuitry 202 may extract the DTV signal from the OTA broadcast signal 302a. The DTV signal may comply with ATSC standard specification (such as ATSC 3.0). The extracted DTV signal may include a plurality of programming content items (hereinafter, referred to programing content items) that may be associated with various broadcaster applications installed on or accessible via the electronic device 102. Specifically, for each broadcaster application of a respective television network, the DTV signal may include a respective programming content item (e.g., a TV episode).

At 304, in-band metadata may be extracted. The circuitry 202 may extract a set of in-band metadata from the extracted DTV signal. The extracted set of in-band metadata (such as ATSC 3.0 TV metadata) may be associated with the programming content items and may include programming information and schedule information associated the programming content items. By way of example, and not limitation, in-band metadata for a programming content item (included in the DTV signal) may include a virtual channel ID, a channel call letter, a program title, a media duration, a current play time, a time of day, a content ratings, among a few other datapoints that typically form a TV listing.

In some embodiments, the extracted set of in-band metadata may also include programming information and schedule information associated with future programming content items to be broadcasted in future (such as in next few hours or days). For example, if at present a basketball match is broadcasted through a live stream on the sports broadcaster's application, the in-band metadata for the live stream may also specify programming and schedule information for an upcoming sports program on the sports broadcaster's application. Additionally, the extracted set of in-band metadata may also include information about audio content, captions, type of audience, and the like.

The in-band metadata of the DTV signal may be delivered from the various local broadcast channels by each individually managed broadcast station. For example, ATSC 3.0 provides expanded metadata structures and content descriptors (as found in the Event Information Table (EIT)). The transmission methodology and metadata structure in the ATSC 3.0 specification uses Program System Identifier Protocol (PSIP) data from a PSIP Generator. The in-band metadata may be delivered using the Programming Metadata Communication Protocol or PMCP. PMCP, defined in the ATSC's A/76B, may provide an ATSC broadcaster with a standardized means to exchange system information (SI) or metadata (in-band metadata) among systems that create and manage these data elements. An example of the in-band metadata in the form of an XML format is given, as follows:

<PmcpMessage id="4294967295" origin="Listing Service"
originType="Listing_Service" dateTime="2020-31-01T09:30:47-05:00"
destination="PSIP Generator"
xsi:schemaLocation="http://www.abz.abz/XMLSchemas/pmcp/2020/3.0
PMCP30.xsd">
<PsipEvent action="add" duration="PT30M">
<EventId channelNumber="57-2">
<InitialSchedule startTime="2020-31-01T10:00:00-05:00"/>
</EventId>
<ShowData>
<Name lang="eng">Barney and Chuck </Name>

```
<Description lang="eng">Exercise/Dance</Description>
<ParentalRating region="1">
<Rating dimension="Children" value="TV-Y"/>
</ParentalRating>
<Audios>
<Ac3Audio audioId="1" lang="eng"/>
</Audios>
<Captions>
<Caption708 service="1" lang="eng"/>
</Captions>
</ShowData>
</PsipEvent>
<PsipEvent action="add" duration="PT30M">
<EventId channelNumber="57-2">
<InitialSchedule startTime="2020-31-01T10:30:00-05:00"/>
</EventId>
<ShowData>
<Name lang="eng">Angels</Name>
<Description lang="eng">Dying to Be Thin</Description>
<ParentalRating region="1">
<Rating dimension="Entire Audience" value="TV-PG">
</ParentalRating>
<Audios>
<Ac3Audio audioId="1" lang="eng"/>
<Ac3Audio audioId="2" lang="eng" serviceType="visually_impaired"/>
</Audios>
<Captions>
<Caption708 service="1" lang="eng"/>
</Captions>
</ShowData>
</PsipEvent>
</PmcpMessage>
```

In the foregoing example, the broadcaster application corresponds to a television channel number of 57-2. The in-band metadata includes a program description for a first programming content item, namely Barney and Chuck, which may be broadcasted at 10:00 AM on 01-31-2020. The first programming content item is described as a TV show associated with exercise and dance and is suitable for children to watch. The audio language and the caption language for the first programming content item is available in English. The in-band metadata also include a program description for a second programming content item, namely Angels, which may be broadcasted at 10:30 AM on 01-31-2020. The second programming content item is suitable for all types of audience. The audio language and the caption language for the second programming content item is also available in English. The second programming content item also includes a separate audio for visually impaired people.

At 306, VOD assets may be selected. Before such a selection is made, all the VOD offerings (which includes a plurality of VOD assets) of VOD applications installed or accessible on the electronic device 102 may be identified. By way of example, and not limitation, a VOD application on the electronic device 102 may correspond to one or more of an Interactive VOD (IVOD) platform, Near VOD (NVOD) platform, a Push VOD (PVOD) platform, a free VOD (FVOD) platform, an advertising-supported VOD (AVOD) platform, a subscription VOD (SVOD) platform, a Transactional VOD (TVOD) platform, or an Electronic Sell-Through (EST) platform. Such VOD platforms are known to one ordinarily skilled in the art and therefore, a description of such VOD platforms is omitted from the disclosure for the sake of brevity.

Once all the offerings of the VOD applications are identified, the circuitry 202 may select a set of VOD assets (hereinafter, referred to as VOD assets) from the plurality of VOD assets (i.e. identified offerings of the VOD applications). Various methods for the selection of the VOD assets are provided herein.

In one embodiment, the circuitry 202 may determine a context of the programming content item(s) that the user may have recently watched or may be current watching on the electronic device 102. The circuitry 202 may also determine a context of each VOD asset of the plurality of VOD assets. Each VOD asset may be selected based on a contextual match between the respective VOD asset and the programming content item(s). Herein, the context may be determined in terms of genre tags or sub-genre tags, program title/description keywords, cast or crew members, past content ratings, script characters, or a combination thereof. For example, if a National Basketball Association (NBA) match is aired live as a programming content item on a sports broadcaster application on the electronic device 102, then a respective VOD asset that may contextually be related to the NBA match may be selected. Also, for finetuning the selection, additional attributes, such as NBA team names or player information may be used to search for similar VOD content/assets that may be available on VOD applications.

In another embodiment, the selection of the VOD assets from the plurality of VOD assets may be performed based on user information 306a. The circuitry 202 may collect the user information 306a, which may include user activity data and user preference data. The user activity data may include, for example, a content viewing history, a usage log of the broadcast applications or the VOD application on the electronic device 102, or user's search history associated with the electronic device 102. Similarly, the user preference data may include content subscriptions (e.g., a subscription to a horror-themed content on a VOD application), content tags which the user mostly selects, search keywords, and other preference datapoints (such as age group, location, sex/gender, or spends/income) which may be derived from user's profile or from one or more data aggregators.

In another embodiment, the selection of the set of VOD assets may be based on a user's preference for one VOD application over another VOD application. In such a case, if the circuitry 202 determines that user prefers to watch content on a first VOD application over other VOD applications, then VOD assets (such as video shows, episodes/season) of the first VOD application may be selected more in comparison to other VOD applications.

At 308, out-of-band metadata may be extracted from the metadata sources 108. The out-of-band metadata from such metadata sources 108 may be extracted to be later combined with the set of in-band metadata (extracted at 304) to expand on details of descriptive coverage and quality of overall content descriptions. For example, there are various metadata sources which supplement standard broadcast descriptors typically included in the in-band metadata. Each one of such metadata sources may store curated metadata with a unique data structure or metadata fields that may be based on data formatting practices of the respective metadata source provider. Historically, metadata sources were managed by companies which worked to supplement cable guides for Multichannel Video Programming Distributors (MVPDs) or other independent broadcast networks. Each metadata source may provide the out-of-band metadata through a particular file format, such as in XML, JSON, structured data file format (such as European Data Format (EDF)), a text file with defined separators/delimiters, or as a template backed by a suitable scripting language (such as JavaScript).

The circuitry 202 may extract a set of out-of-band metadata as individual metadata files from the metadata sources 108. The extracted set of out-of-band metadata may be associated with the programming content items (at 302) and the selected VOD assets (at 306). By way of example, and not limitation, the set of out-of-band metadata may be extracted using standard HTML5 JavaScript commands as JSON or XML files over a WebSocket. When extracted, such files may be stored locally on the memory 204 or in a semi-permanent cached folder or directory on the electronic device 102.

The metadata sources 108 may be accessible via internet and may store curated content descriptors for the programming content items associated with the broadcaster applications. The metadata sources 108 may also contain additional content descriptors for the VOD assets offered by the VOD applications installed or accessible on the electronic device 102. In an embodiment, the metadata sources 108 may be server/cloud-based resources that may be owned and maintained by one or more broadcaster networks or VOD service providers. Alternatively, the metadata sources 108 may be third-party server/cloud-based resources that may store additional curated content descriptors for more than one broadcast network or VOD service provider. By way of example, and not limitation, a metadata source may maintain an online database of information related to films, television programs, home videos, or online streaming content. The online metadata source may provide web APIs with publicly exposed endpoints to access information, such as cast, production crew and personal biographies, plot summaries, trivia, fan and critical reviews, and content ratings. An example of out-of-band metadata in XML format for a programming content item is provided, as follows:

<?xml version="1.0" encoding="UTF-8"?>
<root response="True">
<movie title="Barney and Chuck" year="1992-2009" rated="TV-Y"
released="6 Apr. 1992" runtime="30 min" genre="Family" director="N/A" writer="Dennis DeShazer, Sheryl Leach, Kathy Parker" actors="Julie Johnson, Bob West, Dean Wendt, Carey Stinson" plot="Hey kids! Pick your feet up off the floor; it's time to dance with the dinosaur—Barney, that is, in this high-energy song and dance revue. You can't help but twist and shout to these infectious grooves, a compilation of funky favorites and danceable debuts. When you're ready to get down to some serious singing and swinging, Barney's got the dino dancin' tunes you'll want to see again and again!" language="English" country="USA" awards="1 win & 14 nominations." poster="https://m.media.com/images/SX300.jpg" meta-score="N/A" Rating="3.8" Votes="4,058" ID="tt0144701"
type="series"/></root>

In the foregoing example, details of metadata fields, such as title, year of production, rated audience, runtime, cast and crew names, plot details, content rating, and content language are provided. Details provided in the foregoing example should not be construed as limiting for the disclosure. The present disclosure may be also applicable to other type of data fields or other file formats for the out-of-band metadata, without departing from the scope of the present disclosure.

As per the ATSC specification, the in-band metadata may be delivered as part of a Dynamic Adaptive Streaming over HTTP (DASH) XML manifest file (MPEG-DASH Media Presentation Description (MPD)), which may be sent along with a broadcast video stream via the OTA broadcast signal 302a. However, the in-band metadata typically lacks sufficient depth and detail to satisfy a consumer's curiosity about the programming content item. In order to supplement the in-band metadata, the extracted set of out-of-band metadata may be selectively parsed and later combined with the in-band metadata according to a master template, as described herein.

At 310, a master template may be loaded in the memory 204. The master template may also be referred to as a Master Data File (MDF). In some other embodiments, the electronic device 102 may load a broadcaster-controlled master template or a locally controlled master template. The master template may be downloaded in-band through a DTV signal or out-of-band through external IP-based sources. The benefit of having the master template on the electronic device 102 is that the master template may be used to combine the in-band metadata with the out-of-band metadata.

At 312, the set of in-band metadata (from 304) and the set of out-of-band metadata (from 308) may be parsed. The MDF or the master template may serve as a unified formatter for a unified metadata file which may be obtained after the set of in-band metadata and the set of out-of-band metadata are parsed and combined. In an embodiment, the circuitry 202 may parse the extracted set of in-band metadata and the extracted set of out-of-band metadata. Thereafter, based on the master template (i.e. the MDF), the circuitry 202 may combine the parsed set of in-band metadata and the parsed set of out-of-band metadata into the unified metadata file.

By way of example, and not limitation, for metadata parsing, the master template may be read to determine metadata fields or metadata components which have to be selected from the out-of-band metadata (acquired from various IP sources) and the in-band metadata (i.e. ATSC 3.0 in-band metadata) to be later added into the unified metadata file in a specific format of the master template. An example of selected metadata fields or metadata components from the in-band metadata and the out-of-band metadata for Barney and Chuck is provided in Table 1, as follows:

TABLE 1

Selected metadata fields from in-band metadata and out-of-band metadata

| Metadata Fields (In-Band Metadata) | Metadata Fields (Out-of-Band Metadata) |
| --- | --- |
| InitialSchedule startTime = "2020-31-01T10:30:00-05:00 | movie title = "Barney and Chuck" |
| channelNumber = "57-2" | year = "1992-2009" |
| ShortDescription = "Exercise/Dance" | rated = "TV-Y" |
| ParentalRating region = "1" | runtime = "30 min" |
| language = "English" | genre = "Family" |
|  | actors = "Julie Johnson, Bob West, Dean Wendt, Carey Stinson" |
|  | plot = "Hey kids! Pick your feet up off the floor; it's time to dance with the dinosaur - Barney, that is, in this high-energy song and dance revue. You can't help but twist and shout to these infectious grooves, a compilation of funky favorites and danceable debuts. When you're ready to get down to some serious singing and swinging, Barney's got the dino dancin' tunes you'll want to see again and again!" |

TABLE 1-continued

Selected metadata fields from
in-band metadata and out-of-band metadata

| Metadata Fields (In-Band Metadata) | Metadata Fields (Out-of-Band Metadata) |
|---|---|
| | country = "USA" |
| | awards = "1 win & 14 nominations" |
| | Rating = "3.8" |
| | Votes = "4,058" |

Based on the selected metadata fields in Table 1, an example of a unified metadata file in an XML format is provided, as follows:

<?xml version="1.0" encoding="UTF-8"?>
<root response="True">
<movie title="Barney and Chuck" year="1992-2009" rated="TV-Y"
released="6 Apr. 1992" runtime="30 min" genre="Family" director="N/A" writer="Dennis DeShazer, Sheryl Leach, Kathy Parker" actors="Julie Johnson, Bob West, Dean Wendt, Carey Stinson" plot="Hey kids! Pick your feet up off the floor; it's time to dance with the dinosaur—Barney, that is, in this high-energy song and dance revue. You can't help but twist and shout to these infectious grooves, a compilation of funky favorites and danceable debuts. When you're ready to get down to some serious singing and swinging, Barney's got the dino dancing' tunes you'll want to see again and again!" language="English" country="USA" awards="1 win & 14 nominations." poster="https://m.media.com/images/SX300.jpg" meta-score="N/A" Rating="3.8" Votes="4,058" ID="tt0144701" type="series" InitialSchedule startTime="2020-31-01T10:30:00-05:00" EventId channelNumber="57-2 ShortDescription="Exercise/Dance" ParentalRating region="1"/></root>

In another embodiment, the circuitry 202 may update each metadata field or metadata component of the master template as a dynamically controlled and signaled data element to produce the unified metadata file. For example, using the master template, the circuitry 202 may query the metadata sources 108 to individually update each metadata field of the master template. The updated metadata fields may then be combined together with other metadata fields of the master template (that may be uniformly structured).

In order to handle multiple videos, such as in-band programming content items (broadcast videos) and VOD assets (broadband streaming videos) concurrently on the electronic device 102, metadata associated with such videos may have to be managed in sync with not only the videos individually, but among the videos as an entire event. Each event may be made up of several live videos or curated videos that work together to form a multicast, multi-view event. There is usually a live or timed component to each coordinated event. Each event may have a syncing or a clocking component to it that may serve as a baseline for playout so that audio, video, and timed metadata signals match up in time. Therefore, to handle synch issues for audio, video, and timed metadata signals, the master template may be used to handle the out-of-band metadata from the metadata sources 108.

For example, an event like the Olympics may correspond to a broadcast of a series of curated programming content items (i.e. videos) for multiple sports events as per a broadcast schedule. For each programming content item, a respective metadata source may deliver out-of-band metadata in a structured file to the electronic device 102, but often in a proprietary data format. In case there are multiple out-of-band metadata files for a programming content item, such data files may be segmented by file and then prioritized for use with the master template. Thereafter, metadata fields from a prioritized file may be selected as a data source for a respective metadata field of the metadata template. As an example, for single point metadata components, such as title, actor's name, release date, or rating, the circuitry 202 may query the metadata sources 108 to selectively populate such metadata components into the unified metadata file. In an embodiment, the circuitry 202 may assign a master key code to each metadata file and control which metadata file (i.e. extracted out-of-band metadata) is prioritized and used for the metadata fields of the master template and which metadata file is skipped.

In an embodiment, the master template may include information about the metadata sources and a method to parse the metadata files (both in-band metadata and out-of-band metadata) into discrete data fields and selectively transfer metadata fields of such files into the unified metadata file.

Conversion of each data type of the metadata files into MDF data type may use metadata converters which are essentially a series of filters that isolate each data type, or field, and then take each field and apply standard rules to convert that data type to the MDF data type that matches it. Depending on the broadcaster or key field that matches that broadcaster, the filters may be different, and the rules may also be different. In other words, the template of the in-band metadata and the out-of-band metadata may be converted to the master template by sequential process of filtering and conversion for each field in the in-band metadata and out-of-band metadata.

In another embodiment, the set of in-band metadata and the set of out-of-band metadata, as metadata files, may be individually parsed, individually reformatted, and combined based upon a format structure. Metadata components from the set of in-band metadata and the set of out-of-band metadata may be pulled individually, ranked, and the reformatted based on the master template. The extracted out-of-band metadata as a file may have its own key assigned and each metadata component or field may be referenced. In order to generate the unified metadata file, the circuitry 202 may configure a template and parse the metadata components of the out-of-band metadata into the configured template. Thereafter, the configured template may be used as a common template for all other metadata sources, such as the set of in-band metadata and other out-of-band metadata. The circuitry 202 may generate the unified metadata file by pulling the data from such templates.

In another embodiment, the memory 204 may store a machine learning model, which may be trained to parse various types of metadata structures to look out of suitable metadata components and known data formatting patterns for the master template. The machine learning model may be a Deep Neural Network (DNN), capable of parsing text which may be represented in terms of word vectors/sentence vectors, for example.

The circuitry 202 may implement the machine learning model to inspect the metadata files (i.e. the set of in-band metadata and the set of out-of-band metadata) to look for metadata components based upon known parameters for each type of metadata components, such as an airing date, an airing time, a program title, cast members, or a content rating. For example, a known data formatting pattern may be that the content/program date may exist in proximity to the program title for a network programming event or TV program. Additionally, or alternatively, the machine learning model may be implemented on content server (not shown) which may be communicatively coupled to the electronic device 102. The circuitry 202 may transmit the metadata files to the content server, which may run an indexing program so that incomplete data structures of the metadata files are evaluated and re-evaluated and parsed to identify the suitable metadata components for the master template.

For example, VOD assets tend to be updated once they are created very rarely as it requires a curator to go back and rewrite descriptive material about the media asset. With automated updating techniques built on the machine learning model, attributes about media files may be discovered without human inputs and then selective fields that are previously not being tracked may be incorporated for the suitable metadata components for the master template. An example of this may be in a multi-view content source. If there is a MDF with a particular asset in it like a soccer game and there is a need to make it multi-view capable, then metadata about that MDF file must include new fields such as camera angle, subject matter, play descriptor, athlete of interest, or placement on the screen. Such new fields may be added to the MDF and event template for multi-view mode for that program. In some cases, there may be two separate MDFs for each type of viewing, single view or multi-view.

It should be noted that metadata (in-band or out-of-band) may take many forms, formats, styles, and lengths for each metadata field. The master template may specify the final format of the unified metadata file and conversion of the metadata from initial sources to a mezzanine file format for final conversion. The mezzanine file format for broadcaster metadata may be proprietary to each of the plurality of broadcaster applications. Each of the plurality of broadcaster applications may have database structures that apply metadata to their respective broadcast streams. The final conversion may include parsing the mezzanine files, sorting the fields of the parsed mezzanine files, and applying the conversion database logic. Parsing and compiling for the MDF (or the master template) may take into account variables, such as length, media type, dimensions, delimiters, keywords, tags, location, containers, how pages are ordered, such as tables, columns, keys, and index ID. The conversion of database logic may correspond to exporting of logic into the final MDF (or the master template). The final conversion may further include recompiling and re-indexing the final MDF. Usually, the final MDF may have a plurality of fields for adding the plurality of content descriptors. For example, the final MDF may have a short version and a long version of the selected VOD asset or the programming content for the programming guide.

In some cases, the metadata fields of a metadata file from a particular metadata source may be known and programmed into the master template, which may contain the program instructions on how to parse the metadata file. However, that may be based on pre-existing relationships and licensing of the metadata file for use by either the electronic device 102, or device manufacturer, or the broadcaster/content owner.

At 314, a programming guide 316 may be rendered on the display device 106. The circuitry 202 may control the display device 106 to render the programming guide 316 based on the unified metadata file. The programming guide 316 may be rendered as a graphical interface on the display device 106 102 with programmatically updated UI elements, which may allow a user to look up and watch content items from among various in-band and out-of-band content offerings, such as the programming content items (on the DTV signal) and the selected VOD assets. The circuitry 202 may populate each UI element of the programming guide 316 based on a respective metadata field or metadata component in the unified metadata file.

The programming guide 316 may include a first plurality of viewing options 318 for the programming content items and the selected VOD assets. The first plurality of viewing options 318 may include, for example, clickable thumbnails, content preview windows, video players, playable thumbnails, image/video carousels, slideshows, tiles, Graphical UI elements integrated with a set of action-based offerings, and the like. For example, the programming guide 316 may include preview thumbnails of on-air TV programs as well as upcoming programs from various TV channels. The programming guide 316 may also include clickable thumbnails of the selected VOD assets which may be contextually related to the on-air TV programs or related to the past or recent user activities on the electronic device 102.

In some embodiments, the programming guide 316 may also include a plurality of content descriptors for the programming content items and the selected VOD assets. Examples of a content descriptor may include, but are not limited to, a plot or a program description, genre tags, a content rating, cast and crew information, images/videos (such as trailers/posters), reviews/comments, or content views (current and past viewership).

In an embodiment, the circuitry 202 may cache the unified metadata file for playout as the programming guide 316 on the display device 106. The master template may be programmed to seek metadata updates on a scheduled basis. Therefore, the unified metadata file may be updated regularly on a scheduled basis based on the metadata updates. As the unified metadata file is updated, the programming guide 316 may be updated on scheduled basis to offer new content viewing options with updated content descriptors. With the master template (which is uniformly formatted) and the unified metadata file, all video and audio files (associated with programming content items and VOD assets) may be synchronized together on the programming guide 316.

Embodiments for user-related interactions with the programming guide 316 are described herein. In one embodiment, the circuitry 202 may receive a user input corresponding to a selection of a first viewing option from among the first plurality of viewing options 318 on the programming guide 316. Based on the user input, the circuitry 202 may select a content item as one of the programming content items or the selected VOD assets. In cases where the plurality of content descriptors are not displayed on the programming guide 316, the circuitry 202 may select, from the plurality of content descriptors, a content descriptor associated with the selected content item and then control the display device 106 to display a UI element which includes the selected content descriptor. The UI element may be displayed within a slot of the rendered programming guide 316 or as a callout window adjacent to the selected viewing option. Upon reading the selected content descriptor, another user input on the programming guide 316 may enable the circuitry 202 to decide whether to continue to play the selected content item on the display device 106 or not. Alternatively, while the selected content descriptor is displayed, the circuitry 202 may concurrently control the playback of a portion of the selected content on the display device 106 102. If in case the user decides to select another viewing option, the programming guide 316 may be refreshed to reload the first plurality of viewing options 318.

Additionally, in some embodiments, the circuitry 202 may select a plurality of viewable content items from one or more of the programming content items included in the received DTV signal, the selected VOD assets, or future programming content items to be broadcasted at a future time schedule. Such selection may be based on one or more of an association of the plurality of viewable content items with the selected content item or the user information 306a. After the selection is made, the circuitry 202 may control the display device 106 to render a recommendation UI on the rendered programming guide 316 and may display a second plurality of viewing options on the recommendation UI as viewable recommendations linked to the selected plurality of viewable content items.

For example, the recommendation UI may be displayed next to the media player UI (or the user-selected viewing option). While reading the content descriptor for the user-selected content item, the user may be able to view recommendations for programs (in-band broadcast or VOD) which may be contextually related to the selected content item or which may be based on the user information 306a (includes user preferences and user activities). From the recommendation UI, the user may decide whether to select another viewing option from among the second plurality of viewing options. In either of the cases, the user may be presented with a monolithic guide where the user is provided with the capability to find, read about, look up for, and watch content items or offerings of various content providers (broadcaster applications/VOD applications, without switching between or opening individual broadcaster or VOD applications on the display device 106. An example of the recommendation UI is provided is FIG. 4.

In another embodiment, the circuitry 202 may create a database based on the unified metadata file. The database may include an index of each of the programming content items and the selected VOD assets. The programming guide 316 may include a search UI which may be linked to the created database. At any time, the circuitry 202 may receive a search query via the search UI of the rendered programming guide 316. Based on the received search query, the circuitry 202 may search the created database to select a set of viewable content items as one or more of the programming content items and the selected VOD assets. Thereafter, the circuitry 202 may control the display device 106 to display the selected set of viewable content items as a set of search results on a result UI of the rendered programming guide 316. An example of the search UI is provided is FIG. 5.

Figure 4:
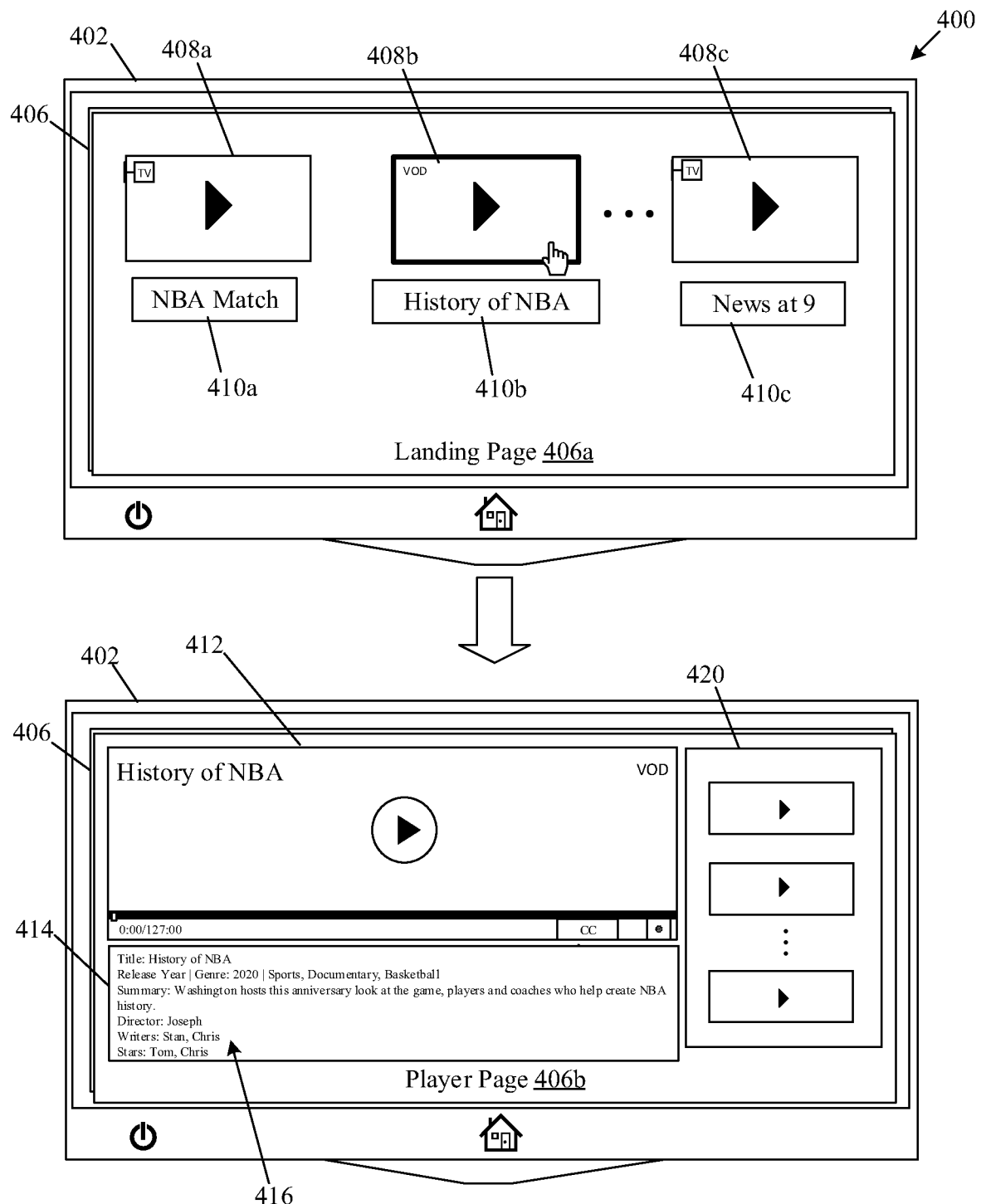
FIG. 4 is a diagram that collectively depicts an exemplary scenario for display of a unified programming guide for content associated with broadcaster and VOD applications, in accordance with an embodiment of the disclosure.

FIG. 4 is a diagram that collectively depicts an exemplary scenario for display of a unified programming guide for content associated with broadcaster and VOD applications, in accordance with an embodiment of the disclosure. FIG. 4 is explained in conjunction with elements from FIG. 1, FIG. 2, and FIG. 3. With reference to FIG. 4, there is shown an exemplary scenario 400.

In the exemplary scenario 400, there is shown a TV 402, which is an exemplary implementation of the electronic device 102 of FIG. 1 or FIG. 2. In this exemplary implementation, the TV 402 may be a smart TV with appropriate middleware and codecs, which may be capable of receiving and/or playback of in-band programming content items and out-of-band VOD, concurrently. There is further shown a display panel 404, which may be an exemplary implementation of the display device 106 of FIG. 1 or FIG. 2. There is further shown a landing page 406a of a programming guide 406 rendered on the display panel 404. On the landing page 406a of the programming guide 406, there is shown a plurality of viewing options 408 for the programming content items included in the DTV signal (as discussed at 302, for example) and VOD assets (as discussed at 306, for example). The plurality of viewing options 408 include a first viewing option 408a, a second viewing option 408b, and a third viewing option 408c. On the landing page 406a, there is also shown a brief content descriptor 410a for the first viewing option 408a, a brief content descriptor 410b for the second viewing option, and a brief content descriptor 410c for the third viewing option 408c.

The first viewing option 408a may be a clickable image thumbnail of a sports programming item associated with a sports broadcaster application. The brief content descriptor 410a may be the title (i.e. NBA match) of the sports programming item. Similarly, the second viewing option 408b may be a clickable video thumbnail of a VOD asset on History of NBA) associated with a VOD application. The brief content descriptor 410b may be the title (History of NBA) of the VOD asset. Similarly, the third viewing option 408c may be another clickable video thumbnail of a programming content item associated with a news broadcaster application. The brief content descriptor 410c may be the title (News at 9) of the programming content item.

At any time, the circuitry 202 may receive a user input corresponding to a selection of a viewing option from the plurality of viewing options 408. The selected viewing option may be associated with either a broadcaster application or a VOD application. For instance, the user input may correspond to a selection of the second viewing option 408b. The circuitry 202 may determine the content item associated with second viewing option 408b. In this case, the content item associated with the second viewing option 408b is a VOD asset, titled "History of NBA" that may be offered by the VOD application.

Based on the selection of the second viewing option 408b, the circuitry 202 may load a player page 406b and control the display panel 404 to render a media player UI 412 on the player page 406b of the rendered programming guide 406. The media player UI 412 may be loaded to play the content item "History of NBA". Additionally, the circuitry 202 may control the display panel 404 to display a UI element 414 within a slot of the player page 406b on the programming guide 406. The UI element 414 may include a content descriptor 416 which may provide a description of the content item to be played on the media player UI 412. As shown, for example, the description includes the title, release year, genre, summary, director, writers, starts/cast for the content item. In some embodiments, the UI element 414 may be displayed as a callout window adjacent to the first viewing option 408a on the landing page 406a. The description may be extracted from a unified metadata file (obtained at 312, for example) which includes programming and schedule information as well as detailed content description for programming content items (in-band broadcast), included in the extracted set of out-of-band metadata.

In another embodiment, the circuitry 202 may render a recommendation UI 420 on the player page 406b of the rendered programming guide 406. The recommendation UI 420 may recommend content items to the user. In an embodiment, the recommend content items may be based on the automatic content recognition (ACR) historical viewing data from the display device 106, out-of-band metadata related to content item currently being rendered on the display device 106, and a viewing profile of the user. In another embodiment, the circuitry 202 may determine the programming content item that is being rendered or the programming content item that been already watched by the user on the display device 106. Such a determination may be based on either a watermark or a programming content item ID (for example Entertainment Identifier Registry (EIDR)) associated with the corresponding programming content item. The circuitry 202 may further determine the recommended content items based on the watermark or EIDR of the content item that is being rendered or have been rendered on the display device 106, when the profile associated with the user is logged in.

To generate the recommendation UI 420, the circuitry 202 may select a plurality of viewable content items based on the unified metadata file for the programming content items and the VOD assets. The plurality of viewable content items may be selected based on an association of the plurality of the viewable content items with the selected content item, i.e. the VOD asset, namely the History of NBA. The association may be established based on, for example, genre information, actors, title words, ratings, or number of views.

For instance, the genre or sub-genre may information for the VOD asset (History of NBA) may include sports, history, and documentary tags with a rating of 7.3 on a scale of 10. A plurality of viewable content items may be associated and the VOD asset. As shown, for example, the plurality of viewable content items may include a VOD asset on baseball highlights with a rating of 8, a TV program with an NBA player as a guest, and another episode of a TV program which the user may have recently watched on the electronic device 102.

Figure 5:
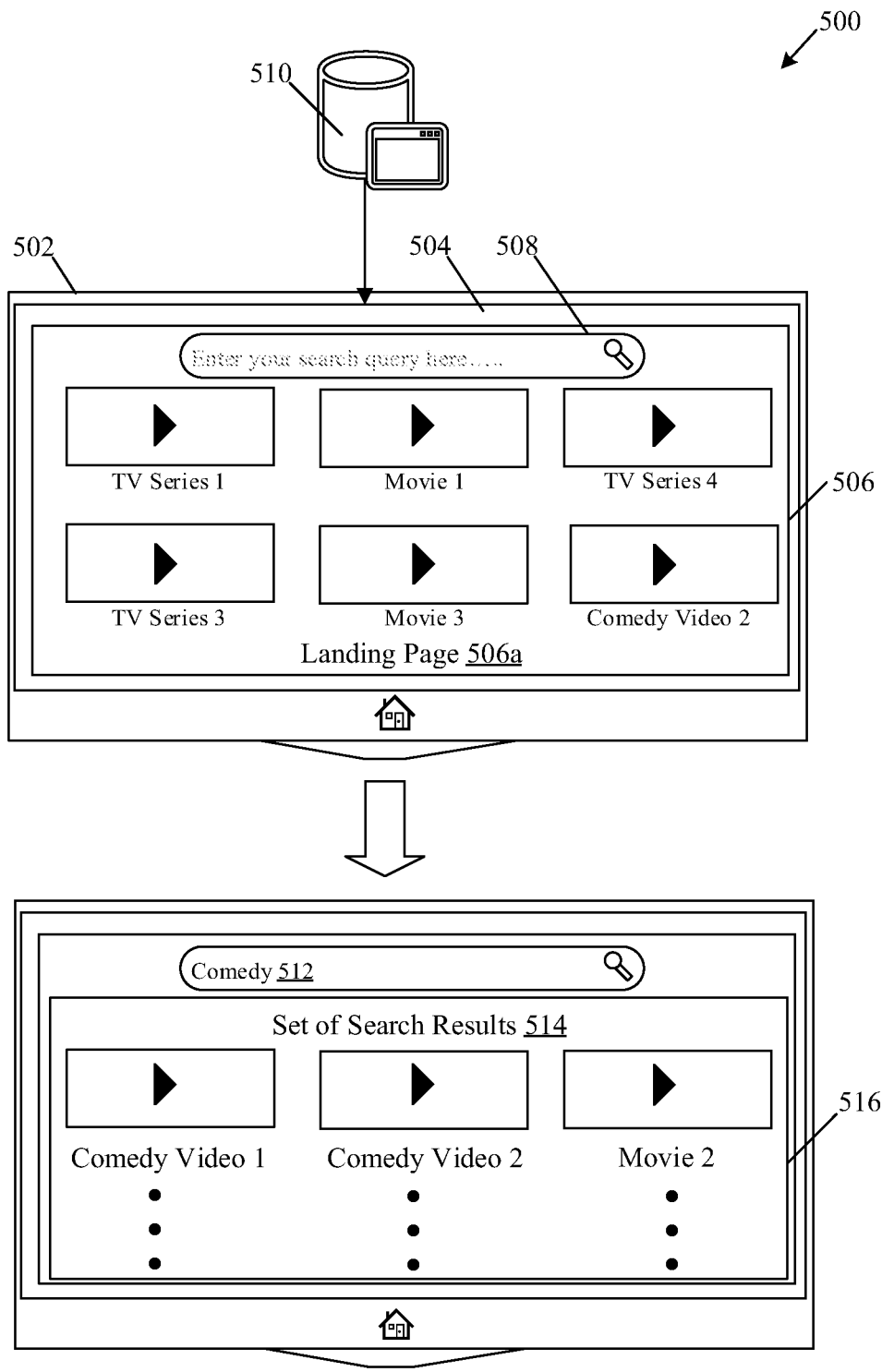
FIG. 5 is a diagram that illustrates an exemplary scenario for content search from a programming guide, in accordance with an embodiment of the disclosure.

FIG. 5 is a diagram that illustrates an exemplary scenario for content search from a programming guide, in accordance with an embodiment of the disclosure. FIG. 5 is explained in conjunction with elements from FIGS. 1, 2, and 3. With reference to FIG. 5, there is shown an exemplary scenario 500. In the exemplary scenario 500, there is shown a TV 502, which is an exemplary implementation of the electronic device 102 of FIG. 1 or FIG. 2. In this exemplary implementation, the TV 502 may be a smart TV with appropriate middleware and codecs, which may be capable of receiving and/or playback of in-band programming content items and out-of-band VOD, concurrently. There is further shown a display panel 504, which may be an exemplary implementation of the display device 106 of FIG. 1 or FIG. 2. There is further shown a landing page 506a of a programming guide 506 rendered on the display panel 504. On the landing page 506a of the programming guide 506, there is shown a search UI 508, which may be provided to facilitate a user to search the programming guide 506 to find in-band programming content items and out-of-band VOD assets.

The programming guide 506 may be rendered on the display panel 504 based on a unified metadata file, which may be obtained based on a combination of the parsed set of in-band metadata and the parsed set of out-of-band metadata (as explained at 312, for example). The TV 502 may store a database 510, which may be created based on the unified metadata file. The database 510 may include an index of each of the programming content items and the selected VOD assets for which programming and schedule information as well as detailed content descriptors are added in the unified metadata file. For example, each of the programming content items and the selected VOD assets may be indexed based on keywords included in the programming and schedule information as well as the detailed content descriptors.

By way of example, the database 510 may be indexed based on the genre, as provided in Table 2:

TABLE 2

Database indexing based on genre

| Index | Type of Application | Viewable content items |
|---|---|---|
| Action | Broadcaster Application 1 | TV Series 1 |
| | | Movie 1 |
| | VOD Application 1 | TV Series 2 |
| | | TV Series 3 |
| Comedy | VOD Application 1 | Comedy Video 1 |
| | VOD Application 2 | Comedy Video 2 |
| | | Movie 2 |
| | Broadcaster Application 2 | Comedy Video 3 |
| | | TV Series 4 |
| Science Fiction | VOD Application 2 | Movie 3 |
| . . . | . . . | . . . |

In Table 2, information associated with only 3 genres is shown for the sake of brevity.

At any time, the circuitry 202 may receive a search query 512 via the search UI 508. The circuitry 202 may search the database 510 based on the search query 512 to select a set of viewable content items. The selected set of viewable content items may be one or more of the programming content items (included in DTV signal) and the selected VOD assets (available on VOD applications). The circuitry 202 may control the display panel 504 to display the selected set of viewable content items as a set of search results 514 on a result UI 516 of the rendered programming guide 506.

As shown, the received search query 512 may be "Comedy". The Table 1 (that represents the database 510) may be searched for "comedy" genre. A set of viewable content items which corresponds to "comedy" genre may be selected. With reference to the Table 1, the selected set of viewable options may include "Comedy Video 1", "Comedy Video 2", "Movie 2", "Comedy Video 3", and "TV Series 4". The selected set of viewable content items may be displayed as the set of search results 514 on the result UI 516. In some embodiments, if a search result is selected from the set of search results 514, the circuitry 202 may control the display panel 504 to load a media player UI on the rendered programming guide 506 and control the playback a content item associated with selected search result.

Figure 6:
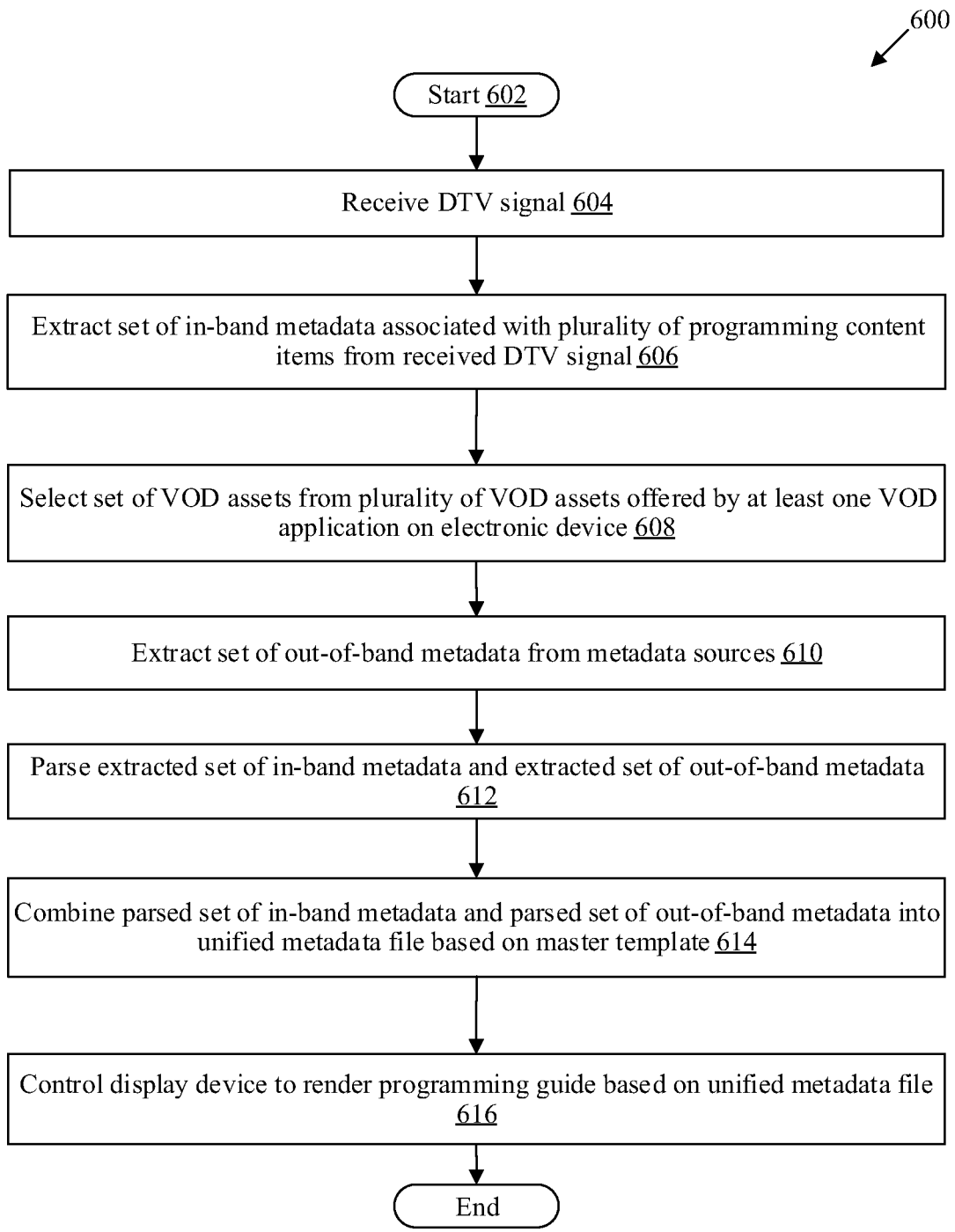
FIG. 6 is a flowchart that illustrates exemplary operations for display of a unified programming guide for content associated with broadcaster and VOD applications, in accordance with an embodiment of the disclosure.

FIG. 6 is a flowchart that illustrates exemplary operations for display of a unified programming guide for content associated with broadcaster and VOD applications, in accordance with an embodiment of the disclosure. FIG. 6 is explained in conjunction with elements from FIGS. 1, 2, 3, 4, and 5. With reference to FIG. 6, there is shown a flowchart 600. The operations from 602 to 616 may be implemented by any computing system, such as by the electronic device 102 of FIG. 1 or FIG. 2. The operations may start at 602 and may proceed to 604.

At 604, a DTV signal may be received. The DTV signal may include the plurality of programming content items associated with the plurality of broadcaster applications 112 on the electronic device 102. In at least one embodiment, the circuitry 202 may be configured to receive the DTV signal that may include the plurality of programming content items.

At 606, a set of in-band metadata associated with the plurality of programming content items may be extracted from the received DTV signal. In at least one embodiment, the circuitry 202 may be configured to extract the set of in-band metadata associated with the plurality of programming content items.

At 608, a set of VOD assets may be selected from a plurality of VOD assets offered by at least one VOD application (such as the VOD application 114) on the electronic device 102. In at least one embodiment, the circuitry 202 may be configured to select the select the VOD) assets from the plurality of VOD assets.

At 610, a set of out-of-band metadata may be extracted from the metadata sources 108. The set of out-of-band metadata may be associated with the plurality of programming content items and the selected set of VOD assets. In at least one embodiment, the circuitry 202 may be configured to extract the set of out-of-band metadata the metadata sources 108.

At 612, the extracted set of in-band metadata and the extracted set of out-of-band metadata may be parsed. In at least one embodiment, the circuitry 202 may parse the extracted set of in-band metadata and the extracted set of out-of-band metadata.

At 614, the parsed set of in-band metadata and the parsed set of out-of-band metadata may be combined into a unified metadata file based on a master template. In at least one embodiment, the circuitry 202 may combine the parsed set of in-band metadata and the parsed set of out-of-band metadata into the unified metadata file based on the master template.

At 616, a programming guide (such as the programming guide 116) may be rendered on the display device 106 based on the unified metadata file. In at least one embodiment, the circuitry 202 may be configured to control the display device 106 to render the programming guide 116 based on the unified metadata file. Control may pass to end.

Various embodiments of the disclosure may provide a non-transitory computer readable medium and/or storage medium having stored thereon, instructions executable by a machine and/or a computer to operate an electronic device, such as the electronic device 102. The instructions may cause the machine and/or computer to perform operations that include receiving a digital television (DTV) signal. The DTV signal may include a plurality of programming content items that may be associated with a plurality of broadcaster applications on the electronic device. The operations may further include extracting a set of in-band metadata associated with the plurality of programming content items from the received DTV signal and selecting a set of VOD assets from a plurality of VOD assets. The plurality of VOD assets may be offered by at least one VOD application on the electronic device. The operations may further include extracting a set of out-of-band metadata that may be associated with the plurality of programming content items and the selected set of VOD assets and parse the extracted set of in-band metadata and the extracted set of out-of-band metadata. The operations may further include combining the parsed set of in-band metadata and the parsed set of out-of-band metadata into a unified metadata file based on a master template and controlling a display device (such as the display device 106) to render a programming guide based on the unified metadata file.

Exemplary aspects of the disclosure may include an electronic device (such as the electronic device 102 of FIG. 1) that includes circuitry (such as the circuitry 202) that may be communicatively coupled to a display device (such as the display device 106 of FIG. 1). In an embodiment, the electronic device may include an ATSC receiver (such as the ATSC receiver 104) which may be configured to receive an Over-the-Air (OTA) broadcast signal (such as the OTA broadcast signal 302a) and extract a DTV signal from the received OTA signal. The DTV signal may be an ATSC 3.0 TV signal. The circuitry may be configured to receive the DTV signal from the ATSC receiver. The DTV signal may include a plurality of programming content items associated with a plurality of broadcaster applications (such as the plurality of broadcaster applications 112) on the electronic device. The circuitry may be further configured to extract a set of in-band metadata associated with the plurality of programming content items from the received DTV signal. The set of in-band metadata may include programming information and schedule information associated the plurality of programming content items included in the received DTV signal and future programming content items to be broadcasted by the plurality of broadcaster applications.

The circuitry may be further configured to select a set of VOD assets from a plurality of VOD assets offered by at least one VOD application (such as the VOD application 114) on the electronic device. In an embodiment, the set of VOD assets may be selected based on a contextual match between the plurality of VOD assets and the plurality of programming content items. In another embodiment, the set of VOD assets may be selected based on user information (such as the user information 306a). The user information may include user activity data and user preference data that may be collected by the electronic device. The use activity data may include a content viewing history, a usage log of the plurality of broadcast applications or the at least one VOD application on the electronic device, or user's search history associated with the electronic device.

The circuitry may be further configured to extract a set of out-of-band metadata associated with the plurality of programming content items and the selected set of VOD assets from at least one metadata source (such as the metadata sources 108). The extracted set of out-of-band metadata may include additional content descriptors for at least the plurality of programming content items and the selected set of VOD assets.

In accordance with an embodiment, the circuitry may be configured to parse the extracted set of in-band metadata and the extracted set of out-of-band metadata. The circuitry may be further configured to combine the parsed set of in-band metadata and the parsed set of out-of-band metadata into a unified metadata file based on a master template and control the display device to render a programming guide (such as the programming guide 406) based on the unified metadata file.

In accordance with an embodiment, the programming guide may include a first plurality of viewing options (such as the plurality of viewing options 118) for the plurality of programming content items and the selected set of VOD assets. In some other embodiments, the programming guide may also include a plurality of content descriptors (such as the plurality of content descriptors 120) for the plurality of programming content items and the selected set of VOD assets.

In accordance with an embodiment, the circuitry may be further configured to receive a user input on a viewing option of the first plurality of viewing options displayed on the programming guide. The circuitry may be further configured to select a content item as one of the plurality of programming content items or the selected set of VOD assets based on the received user input.

In accordance with an embodiment, the circuitry may be further configured to control the display device to render a media player user interface (UI) (such as the media player UI 412) in the rendered programming guide. The circuitry may be further configured to control playback of the selected content item within the rendered media player UI.

In accordance with an embodiment, the circuitry may be further configured to select a content descriptor from the plurality of content descriptors. The selected content descriptor may be associated with the selected content item. The circuitry may be further configured to control the display device to display a UI element (such as the UI element 414) comprising the selected content descriptor. The UI element may be displayed within a slot of the rendered programming guide or as a callout window adjacent to the viewing option.

In accordance with an embodiment, the circuitry may be further configured to select a plurality of viewable content items from the plurality of programming content items included in the received DTV signal, the selected set of VOD assets, or future programming content items to be broadcasted. The plurality of viewable content items may be selected based on one or more of an association with the selected content item or the user information.

In accordance with an embodiment, the circuitry may be configured to render a recommendation UI (such as the recommendation UI 420) on the rendered programming guide. The circuitry may be further configured to display a second plurality of viewing options on the recommendation UI as viewable recommendations linked to the selected plurality of viewable content items.

In accordance with an embodiment, the circuitry 202 may be configured to create a database (such as the database 510) that may include an index of each of the plurality of programming content items and the selected set of VOD assets based on the unified metadata file. The circuitry may be further configured to receive a search query via a search UI of the rendered programming guide. The circuitry may be further configured to search the created database to select a set of viewable content items as one or more of: the plurality of programming content items and the selected set of VOD assets based on the received search query. The circuitry may be further configured to control the display device to display the selected set of viewable content items as a set of search results on a result UI (such as the result UI 516) of the rendered programming guide.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
circuitry communicatively coupled to a display device, wherein the circuitry is configured to:
   receive a digital television (DTV) signal comprising a plurality of programming content items associated with a plurality of broadcaster applications on the electronic device;
   extract, from the received DTV signal, a set of in-band metadata associated with the plurality of programming content items;
   select a set of Video-On-Demand (VOD) assets from a plurality of VOD assets offered by at least one VOD application on the electronic device;
   extract, from at least one metadata source, a set of out-of-band metadata associated with the plurality of programming content items and the selected set of VOD assets;
   select a first set of metadata fields to be parsed from the extracted set of in-band metadata and a second set of metadata fields to be parsed from the extracted set of out-of-band metadata, wherein the selection of the first set of metadata fields and the second set of metadata fields is based on a master template;
   parse the extracted set of in-band metadata and the extracted set of out-of-band metadata based on the selected first set of metadata fields and the second set of metadata fields respectively;
   convert a data type of each of the parsed set of in-band metadata and the parsed set of out-of-band metadata into a data type of the master template;
   combine the parsed set of in-band metadata and the parsed set of out-of-band metadata into a unified metadata file based on the conversion of the data type of each of the parsed set of in-band metadata and the parsed set of out-of-band metadata into the data type of the master template; and
   control the display device to render a programming guide based on the unified metadata file, wherein
      the plurality of programming content items and the set of VOD assets are listed in the programming guide as a single interface, and
      the plurality of programming content items and the set of VOD assets are playable from the single interface without a switch between the plurality of broadcaster applications and the at least one VOD application.

2. The electronic device according to claim 1, further comprising an Advanced Television Systems Committee (ATSC) receiver configured to:
   receive an Over-the-Air (OTA) broadcast signal; and
   extract the DTV signal from the received OTA signal, wherein the DTV signal is an ATSC 3.0 TV signal.

3. The electronic device according to claim 1, wherein the extracted set of in-band metadata comprises programming information and schedule information associated with the plurality of programming content items and future programming content items broadcasted by the plurality of broadcaster applications, and the extracted set of out-of-band metadata comprises additional content descriptors for at least one of the plurality of programming content items or the selected set of VOD assets.

4. The electronic device according to claim 1, wherein the circuitry is further configured to select the set of VOD assets based on a contextual match between the plurality of VOD assets and the plurality of programming content items.

5. The electronic device according to claim 1, wherein
the circuitry is further configured to select the set of VOD assets from the plurality of VOD assets based on user information associated with a user, and
the user information includes at least one of an age group, a location, a gender, or income of the user.

6. The electronic device according to claim 5, wherein
the circuitry is further configured to collect the user information, and
the user information further comprises user activity data.

7. The electronic device according to claim 6, wherein the user activity data comprises at least one of a content viewing history, a usage log of at least one of the plurality of broadcast applications or the at least one VOD application on the electronic device, or user's search history associated with the electronic device.

8. The electronic device according to claim 1, wherein the rendered programming guide comprises:
a first plurality of viewing options for the plurality of programming content items and the selected set of VOD assets, and
a plurality of content descriptors for the plurality of programming content items and the selected set of VOD assets.

9. The electronic device according to claim 8, wherein the circuitry is further configured to:
receive a user input on a viewing option of the first plurality of viewing options displayed on the programming guide; and
based on the received user input, select a content item as one of the plurality of programming content items or the selected set of VOD assets.

10. The electronic device according to claim 9, wherein the circuitry is further configured to:
control the display device to render a media player user interface (UI) in the rendered programming guide; and
control playback of the selected content item within the rendered media player UI.

11. The electronic device according to claim 9, wherein the circuitry is further configured to:
select, from the plurality of content descriptors, a content descriptor associated with the selected content item; and
control the display device to display a UI element comprising the selected content descriptor,
wherein the UI element is displayed one of within a slot of the rendered programming guide or as a callout window adjacent to the viewing option.

12. The electronic device according to claim 9, wherein
the circuitry is further configured to select a plurality of viewable content items from at least one of the plurality of programming content items included in the received DTV signal, the selected set of VOD assets, or future programming content items broadcasted by the plurality of broadcaster applications, and
the plurality of viewable content items is selected based on at least one of an association with the selected content item or user information.

13. The electronic device according to claim 12, wherein the circuitry is further configured to control the display device to:
render a recommendation UI on the rendered programming guide; and
display a second plurality of viewing options on the recommendation UI as viewable recommendations linked to the selected plurality of viewable content items.

14. The electronic device according to claim 1, wherein the circuitry is further configured to:
create, based on the unified metadata file, a database comprising an index of each of the plurality of programming content items and the selected set of VOD assets;
receive a search query via a search UI of the rendered programming guide;
search, based on the received search query, the created database to select a set of viewable content items as at least one of the plurality of programming content items or the selected set of VOD assets; and
control the display device to display the selected set of viewable content items as a set of search results on a result UI of the rendered programming guide.

15. The electronic device according to claim 1, wherein the circuitry is further configured to:
assign a master key code to each of the extracted set of out-of-band metadata; and
determine each of a prioritized out-of-band metadata and a skipped out-of-band metadata of the extracted set of out-of-band metadata based on the assigned master key code.

16. The electronic device according to claim 1, wherein the circuitry is further configured to:
store a trained machine learning model; and
parse the extracted set of in-band metadata and the extracted set of out-of-band metadata based on an application of the trained machine learning model.

17. A method, comprising:
receiving a digital television (DTV) signal comprising a plurality of programming content items associated with a plurality of broadcaster applications on an electronic device;
extracting, from the received DTV signal, a set of in-band metadata associated with the plurality of programming content items;
selecting a set of Video-On-Demand (VOD) assets from a plurality of VOD assets offered by at least one VOD application on the electronic device;
extracting, from at least one metadata source, a set of out-of-band metadata associated with the plurality of programming content items and the selected set of VOD assets;
selecting a first set of metadata fields to be parsed from the extracted set of in-band metadata and a second set of metadata fields to be parsed from the extracted set of out-of-band metadata, wherein the selection of the first set of metadata fields and the second set of metadata fields is based on a master template;
parsing the extracted set of in-band metadata and the extracted set of out-of-band metadata based on the selected first set of metadata fields and the second set of metadata fields respectively;
converting a data type of each of the parsed set of in-band metadata and the parsed set of out-of-band metadata into a data type of the master template;

combining the parsed set of in-band metadata and the parsed set of out-of-band metadata into a unified metadata file based on the conversion of the data type of each of the parsed set of in-band metadata and the parsed set of out-of-band metadata into the data type the master template; and controlling a display device to render a programming guide based on the unified metadata file, wherein
the plurality of programming content items and the set of VOD assets are listed in the programming guide as a single interface, and
the plurality of programming content items and the set of VOD assets are playable from the single interface without a switch between the plurality of broadcaster applications and the at least one VOD application.

18. The method according to claim 17, wherein
the extracted set of in-band metadata comprises programming information and schedule information associated with the plurality of programming content items and future programming content items broadcasted by the plurality of broadcaster applications, and
the extracted set of out-of-band metadata comprises additional content descriptors for at least one of the plurality of programming content items or the selected set of VOD assets.

19. The method according to claim 17, wherein the selection of the set of VOD assets is based on a contextual match between the plurality of VOD assets and the plurality of programming content items.

20. A non-transitory computer-readable medium having stored thereon, computer-executable instructions which, when executed by a computer in an electronic device, cause the computer to execute operations, the operations comprising:

receiving a digital television (DTV) signal comprising a plurality of programming content items associated with a plurality of broadcaster applications on the electronic device;

extracting, from the received DTV signal, a set of in-band metadata associated with the plurality of programming content items;

selecting a set of Video-On-Demand (VOD) assets from a plurality of VOD assets offered by at least one VOD application on the electronic device;

extracting, from at least one metadata source, a set of out-of-band metadata associated with the plurality of programming content items and the selected set of VOD assets;

selecting a first set of metadata fields to be parsed from the extracted set of in-band metadata and a second set of metadata fields to be parsed from the extracted set of out-of-band metadata, wherein the selection of the first set of metadata fields and the second set of metadata fields is based on a master template;

parsing the extracted set of in-band metadata and the extracted set of out-of-band metadata based on the selected first set of metadata fields and the second set of metadata fields respectively;

converting a data type of each of the parsed set of in-band metadata and the parsed set of out-of-band metadata into a data type of the master template;

combining the parsed set of in-band metadata and the parsed set of out-of-band metadata into a unified metadata file based on the conversion of the data type of each of the parsed set of in-band metadata and the parsed set of out-of-band metadata into the data type of the master template; and controlling a display device to render a programming guide based on the unified metadata file, wherein
the plurality of programming content items and the set of VOD assets are listed in the programming guide as a single interface, and
the plurality of programming content items and the set of VOD assets are playable from the single interface without a switch between the plurality of broadcaster applications and the at least one VOD application.

* * * * *